(12) United States Patent
Aghilone (10) Patent No.: US 10,563,821 B2
(45) Date of Patent: Feb. 18, 2020

(54) CARTRIDGE FOR STORING COMPRESSED AIR

(71) Applicant: TECHNOFLUID ENGINEERING S.R.L., Cesano Maderno (MI) (IT)

(72) Inventor: Marcello Aghilone, Pezenas (FR)

(73) Assignees: Marcello Aghilone, Pezenas (FR); TECHNOFLUID ENGINEERING S.r.L., Cesano Maderno (MI) (IT)

( * ) Notice: Subject to any disclaimer, the term of this patent is extended or adjusted under 35 U.S.C. 154(b) by 850 days.

(21) Appl. No.: 15/101,903

(22) PCT Filed: Dec. 4, 2014

(86) PCT No.: PCT/FR2014/053162
§ 371 (c)(1),
(2) Date: Jun. 4, 2016

(87) PCT Pub. No.: WO2015/082850
PCT Pub. Date: Jun. 11, 2015

(65) Prior Publication Data
US 2016/0312957 A1 Oct. 27, 2016

(30) Foreign Application Priority Data
Dec. 4, 2013 (FR) .................................... 13 62069

(51) Int. Cl.
*B60S 5/04* (2006.01)
*F17C 13/04* (2006.01)
*F17C 13/02* (2006.01)

(52) U.S. Cl.
CPC ............. *F17C 13/04* (2013.01); *B60S 5/04* (2013.01); *F17C 13/025* (2013.01);
(Continued)

(58) Field of Classification Search
CPC ............ F17C 13/025; F17C 2205/0335; F17C 2205/0329; F17C 13/04; F16J 13/00; G01L 17/00; F16K 51/00
(Continued)

(56) References Cited

U.S. PATENT DOCUMENTS 2,507,778 A * 5/1950 Frey ........................ F17C 1/06
220/560.06
5,409,526 A * 4/1995 Zheng ................ B01D 53/0415
55/385.4
(Continued)

FOREIGN PATENT DOCUMENTS

DE 42 15 620 A1 11/1993
EP 0 496 091 A1 7/1992
(Continued)

*Primary Examiner* — Anthony D Stashick
*Assistant Examiner* — Raven Collins
(74) *Attorney, Agent, or Firm* — Craft Chu PLLC; Andrew W. Chu (57) ABSTRACT

The cartridge includes a body containing the air and a head closing the body. There is a filling channel, which connects the outside of the cartridge to the body and which includes a filling non-return valve preventing the air from exiting the body. The head includes an inflation channel, which connects the filling channel to the body and includes an inflation non-return valve preventing the air from exiting the body. An inflation organ is movably mounted on the inflation channel to permit opening of the inflation non-return valve.

15 Claims, 4 Drawing Sheets

(52) U.S. Cl.
CPC . *F17C 2201/0119* (2013.01); *F17C 2201/058* (2013.01); *F17C 2205/0329* (2013.01); *F17C 2205/0364* (2013.01); *F17C 2205/0385* (2013.01); *F17C 2205/0394* (2013.01); *F17C 2221/031* (2013.01); *F17C 2223/0123* (2013.01); *F17C 2223/035* (2013.01); *F17C 2223/036* (2013.01); *F17C 2250/043* (2013.01); *F17C 2270/0165* (2013.01); *F17C 2270/0736* (2013.01); *F17C 2270/0772* (2013.01)

(58) Field of Classification Search
USPC .......................................................... 220/581
See application file for complete search history.

(56) References Cited

U.S. PATENT DOCUMENTS

| | | | |
|---|---|---|---|
| 5,429,267 A * | 7/1995 | San | F17C 1/00 |
| | | | 220/501 |
| 6,230,516 B1 * | 5/2001 | Andonian | A62B 7/06 |
| | | | 62/461 |
| 2009/0114294 A1 | 5/2009 | Wallace | |
| 2009/0223838 A1 * | 9/2009 | Tseng | F17C 13/00 |
| | | | 206/6 |

FOREIGN PATENT DOCUMENTS

| | | |
|---|---|---|
| EP | 2 250 426 A1 | 11/2010 |
| EP | 2 596 277 A1 | 5/2013 |
| FR | 2 244 123 A1 | 4/1975 |
| WO | 2013076429 | 5/2013 |

* cited by examiner

CARTRIDGE FOR STORING COMPRESSED AIR

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a compressed-air storage cartridge, namely a compressed-air storage cartridge adapted to be connected to a filling device carried by a cycle and connected to a pedal of the cycle so as to permit the compression of air in the cartridge while pedaling.

2. Description of Related Art Including Information Disclosed Under 37 CFR 1.97 and 37 CFR 1.98.

There are many types of compressed-air storage cartridges.

A first type is that of the single-use compressed-air storage cartridges. After having filled a cartridge with compressed air, then sealed it, the compressed air is used and the cartridge is then disposed of or recycled. In general, the storage cartridge comprises a shell containing the compressed air and a single-use valve permitting the confinement of compressed air in the shell. The actuation of the single-use valve permits the compressed air to escape from the cartridge. When recycling the cartridge, it is necessary to replace the single-use valve and to check the integrity of the shell before considering again its filling with compressed air.

A second type is that of the compressed-air storage cartridges provided with permanent valves. The permanent valve, permitting to facilitate the filling of the cartridge, is in the form of a non-return valve the actuation of which releases the entering or exiting of compressed air. The non-return valve is movably mounted and held in the closed position, either by springy restoring means (the non-return valve opens under the effect of a mechanical action, namely by screwing a hose having a lug applying a force inverse to and higher than the restoring force) or by mechanical actuating means (the non-return valve is actuated manually by a control organ, which is generally in the form of a wheel the screwing direction of which permits to release or to lock the valve).

A drawback of these types of compressed-air storage cartridge resides in the opening and closing of the valve directly at the outlet of the cartridge. The control of this opening remains tedious and is therefore often mismanaged, resulting into a loss of compressed air, especially in the case of a mechanical closure with restoring. In addition, in this case, the wear over time of the restoring means causes a decrease of tightness provided by the valve.

In addition, it is not possible to know the quantity of stored compressed air, nor the pressure at the exit, without adding a pressure gauge to the cartridge. Such an addition requires an additional circuit, which inevitably leads to a loss of compressed air.

Furthermore, it is difficult to gauge the inflation of an equipment using such cartridges, so that in case of an inflation higher than the desired pressure, the compressed air must be expelled from the inflated equipment after having disconnected the cartridge.

BRIEF SUMMARY OF THE INVENTION

The aim of the present invention is to cope with the drawbacks of the state of the art.

The invention relates to a compressed-air storage cartridge comprising a body, which is adapted for storing the compressed air, and a head, which is adapted for hermetically closing the body and which comprises a filling channel connecting a connecting orifice ending outside the cartridge to a filling orifice ending into the body, the filling channel comprising a filling non-return valve that prevents the compressed air from leaving the body, wherein the head comprises a inflation channel, which connects the filling channel to an inflation orifice ending into the body, which comprises an inflation non-return valve preventing the compressed air from leaving the body, and in which is movably mounted an inflating organ actuated by an inflation button and permitting the opening of the inflation non-return valve.

Thus, according to the invention, due to the presence of a filling channel, which ends into the body and which comprises a filling non-return valve preventing the compressed air from leaving the body, and an inflation channel, which is different from the filling channel, which ends into the body and which comprises an inflation non-return valve preventing the compressed air from leaving the body, the cartridge permits both inflating an inflatable equipment with the compressed air contained in the body and filling the body with compressed-air.

According to a first embodiment, the filling non-return valve is open when the pressure from a compressed-air supply means connected to the connecting orifice is higher than the pressure prevailing in the body.

According to a second embodiment, the head comprises a springy inflation restoring means urging the inflating organ into a locked inflation position, in which the inflating non-return valve prevents the compressed air from leaving the body.

According to a third embodiment, the head comprises a pressure gauge connected to the filling channel while passing through a valve controlled by a button.

According to an advantageous variant of the third embodiment, the valve is formed by the inflating organ and the button is formed by the inflation button.

According to a preferred variant, when the cartridge is according to the second embodiment and the advantageous variant of the third embodiment, the compressed air contained in the filling channel reaches the pressure gauge when the inflating organ reaches a position for connecting to the pressure gauge located between the locked inflation position and a position from which the inflating non-return valve is open.

Preferably, the compressed air contained in the filling channel reaches the pressure gauge when the inflating organ reaches a position in which the inflation non-return valve is open.

According to a fourth embodiment, the head comprises a deflation channel, which connects the filling channel to an orifice ending outside the cartridge, which comprises a deflation non-return valve preventing the compressed air from leaving the cartridge, and in which is movably mounted a deflation organ actuated by a deflation button and permitting the opening of the deflation non-return valve.

According to a first advantageous variant of the fourth embodiment, the head comprises a springy deflation restoring means urging the deflation organ into a position, in which the deflation non-return valve prevents the compressed air from leaving the cartridge.

According to a second advantageous variant of the fourth embodiment, the inflation button and the deflation button may be actuated simultaneously.

According to a fifth embodiment, the head comprises a pressure indicator permitting to know the quantity of compressed air in the body.

According to a sixth embodiment, the head comprises a safety valve, which opens when the pressure prevailing in the body reaches a safety value.

Further features and advantages will become clear from the detailed description of non-restrictive embodiments of the invention illustrated in the drawings.

DETAILED DESCRIPTION OF THE INVENTION

The present invention relates to a compressed-air storage cartridge 1.

Such a cartridge 1 comprises a body 2 and a head 3.

The body 2 may have any shape and, according to the preferred, non-restrictive embodiment, it has a cylindrical shape. The body 2 constitutes a tight casing forming internally a volume for receiving and storing compressed air. The tight casing has a single opening, which is located at the level of one end 4 of the body 2.

The head 3 has a shape similar to that of the body 2, and, according to the preferred, non-restrictive embodiment, it has a cylindrical shape with a peripheral diameter equivalent to that of the body 2.

Figure 2:
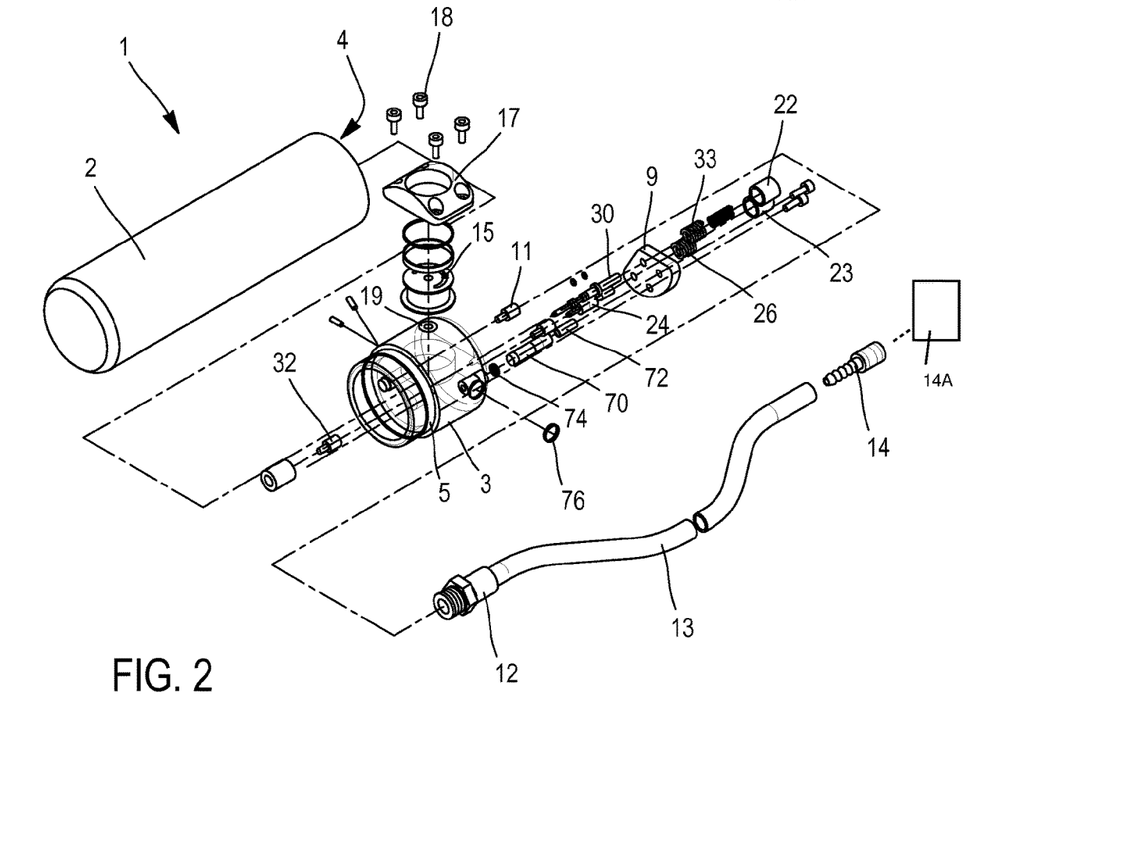
FIG. 2 is an exploded schematic view of the cartridge and the connecting hose of FIG. 1.
Figure 3:
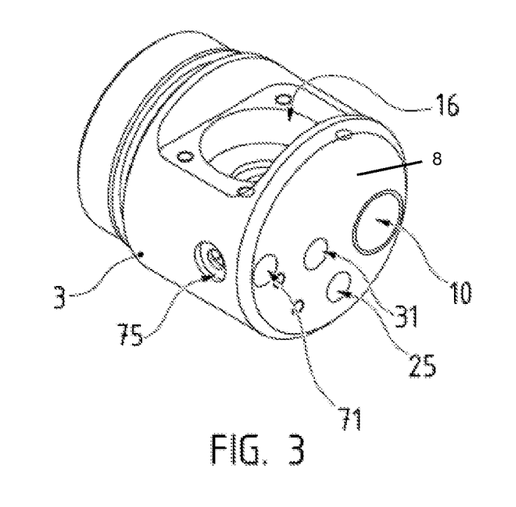
FIG. 3 is a schematic view in three-quarter perspective, showing a head of the cartridge of FIGS. 1 and 2.
Figure 4:
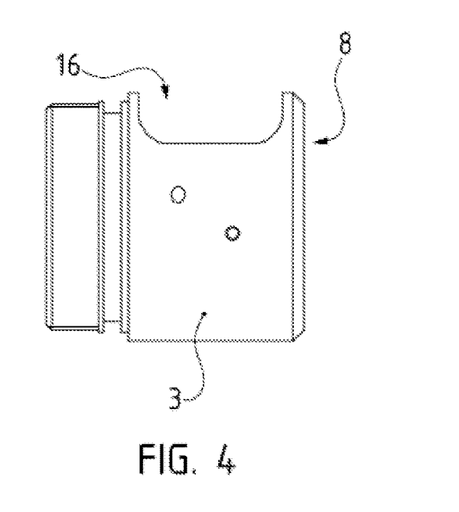
FIG. 4 is a side schematic view of the head of FIG. 3.

The opening of the body 2 at the level of its end 4 is tightly closed by the head 3, which is fixed to the body 2. This fixing can be performed by any means, namely by screwing of an external thread provided for at the level of the periphery at one side of the head 3 cooperating with a complementary internal thread provided for internally in the wall at the level of the end 4. As can be seen in FIG. 2, a connecting seal 5, preferably an O-ring, may be intercalated between the head 3 and the body 2 in order to improve the tightness of the fastening of these two elements. To this end, a peripheral connecting groove 50 is provided for around the head 3 at the level of the end aimed at cooperating with the body 2.

Advantageously, the head 3 constitutes an exchanger permitting the compressed air to circulate between the inside and the outside of the cartridge 1. In particular, the head 3 permits to fill the body 2 with compressed air, to know the quantity of compressed air in the body 2 and, when an inflatable equipment is connected to the head 3, to measure the pressure of the inflatable equipment, to deflate the inflatable equipment and to inflate it with compressed air contained in the body 2.

In order to perform these various operations, the head 3 comprises control means 6. The control means 6 comprise several organs, which cooperate within the head 3.

In order to know the quantity of compressed air in the body 2, the head 3 comprises a pressure indicator 7. This pressure indicator 7 is preferably in the form of a measuring organ 70 movably mounted as a single-acting piston in a measuring channel 71, which is provided for in the head 3 (in this case, the measuring channel 71 extends parallel to the longitudinal median axis of the head 3) and which ends into the body 2. In particular, the end of the head 3, which obstructs the single opening of the body 2 comprises a measuring orifice 73, which ensures that the compressed air contained in the body 2 penetrates into the measuring channel 71.

The tightness between the measuring organ 70 and the measuring orifice 73 is ensured by a measuring seal 74, which is here an O-ring.

The measuring channel 71 comprises at its end opposite the one of the measuring orifice 73, a mounting hole made at the level of a distal face 8 of the head 3. Through this mounting hole are inserted the elements constituting the pressure indicator 7, among which the measuring organ 70 and the measuring seal 74.

The measuring organ 70 is held inside the measuring channel 71 by a springy measuring restoring means 72, which is here in the form of a compression spring 72. The springy measuring restoring means 72 is provided so as to offer resistance to the displacement of the measuring organ 70 in translation along the measuring channel 71. The springy measuring restoring means 72 is sized and configured so as to compress more or less depending on the pressure prevailing in the body 2 and to ensure the displacement of the measuring organ 70 over a more or less large length along the measuring channel 71.

The measuring organ 70 and the springy measuring restoring means 72 are maintained compressed within the measurement channel 71 by a tight closing plate 9. The closing plate 9 closes the mounting hole of the measuring channel 71 located at the level of the distal face 8 of the head 3.

Therefore, in order to play the role of a pressure gauge indicator 7, the measuring organ 70 is, for example, externally provided with a graded or colored coating (e.g. several successive colors, such as green and red). The displacement of the measuring organ 70 with respect to a fixed point thus permits to indicate a level of pressure inside the body 2.

In order to indicate the level of pressure, the head 3 has a viewing window 75, which is provided for in the outer wall of the head 3 and which ends into the measurement channel 71 in front of the measuring organ 70 and its colored or graded coating. The viewing window 75 is tightly closed by a transparent window 76.

Figure 6:
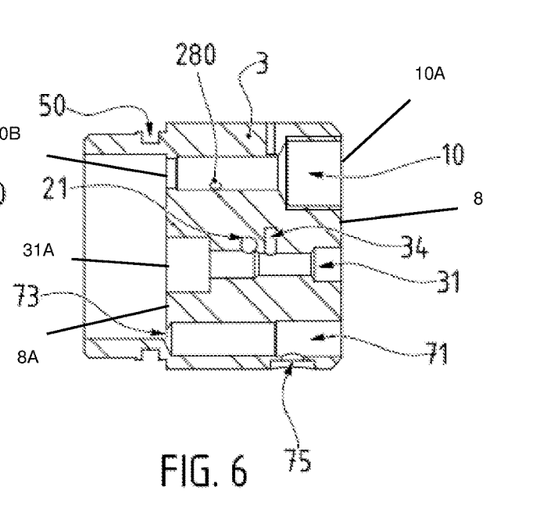
FIG. 6 is a schematic cross-sectional view in a substantially median and horizontal plane the head of FIGS. 3 to 5.

The different elements constituting the pressure indicator 7 are particularly visible in FIGS. 2 and 6.

Thus, it is possible to quickly know, at a single glance, the approximate quantity of compressed air contained in the cartridge 1 (even to know whether the cartridge 1 is empty).

Essentially, in order to namely ensure the filling of the internal volume of the body 2, the head 3 comprises a filling channel 10. The filling channel 10 passes through the head 3 and extends from the distal face 8 to a filling orifice 10B on a proximal face 8A opposite the distal face that is provided for at the end of the head 3 obstructing the single opening 2A of the body 2. This filling orifice permits the filling channel 10 to be brought in communication with the body 2. This filling channel 10 forms a part of a flowing circuit permitting the compressed air to flow between the body 2 and the outside of the cartridge 1 (the measurement channel 71 is not part of the flowing circuit).

The filling channel 10 extends parallel to the longitudinal median axis of the head 3.

In order to let the compressed air flow only from the outside of the cartridge 1 to the body 2, the filling channel 10 (preferably at the level of the filling orifice) comprises a filling non-return valve 11.

Preferably, the filling non-return valve 11 is maintained within the filling channel 10 by fixing a nozzle 12 at the level of the distal face 8. This fastening can be ensured namely by screwing an external thread, which is provided for externally to the nozzle 12 and which cooperates with a complementary internal thread provided for internally at the level of the filling channel 10 (more precisely at the level of a connection hole, which is the opening of the filling channel 10 at the level of the distal face 8).

Any kind of nozzle 12 may be attached to the head 3. According to the preferred embodiment, shown in FIGS. 1 and 2, the nozzle 12 is arranged at a first end of a connecting hose 13 that permits to connect the cartridge 1 to an inflatable equipment or to a compressed-air supply means 14A such as an air-compression means. The connecting hose 13 comprises at the level of its second end a connector 14, for example of the "Schrader" type, permitting namely to tightly connect the connecting hose 13 to a valve of a tire.

In case it is necessary to fill the body 2 with compressed air, the connecting hose 13 is connected to the connecting orifice 10A and to a compressed-air supply means 14A (preferably device carried on a cycle and connected to a pedal of the cycle, such as the one disclosed in patent application WO 2013/076429). The compressed-air pressure produced by the compressed-air supply means 14A fills the connecting hose 13 and the filling channel 10. When the compressed-air pressure produced by the compressed-air supply means 14A is higher than the pressure prevailing in the body 2, the filling non-return valve 11 passes from a closed filling position to an open filling position and permits the filling of the body 2.

Figure 1:
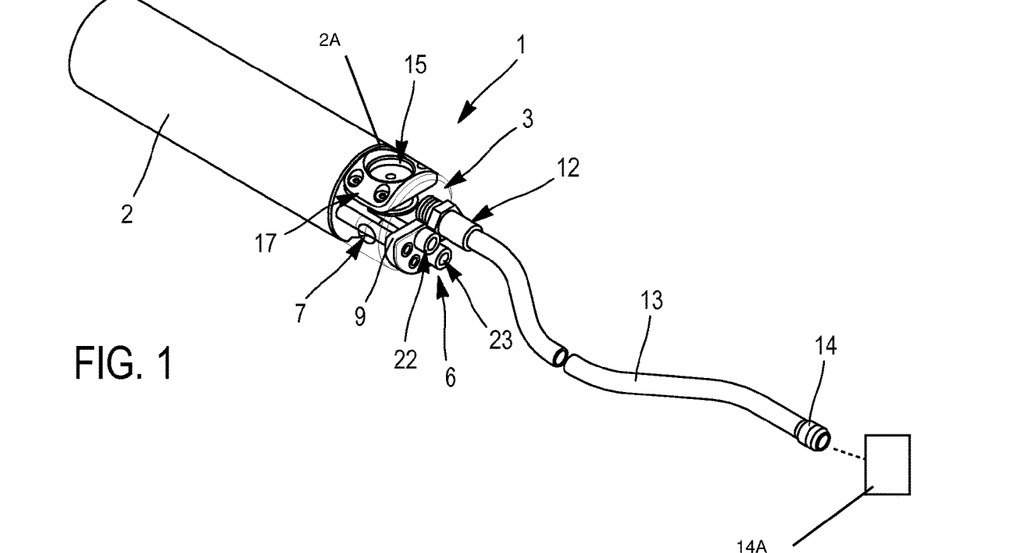
FIG. 1 is a schematic view in perspective and partially in transparent view of a cartridge and a connecting hose according to a first embodiment of the invention.

The various elements relating to the filling channel 10 are particularly visible in FIGS. 1 and 6.

In order to measure the pressure prevailing in the inflatable equipment connected to the cartridge 1 through the connecting hose 13, the head 3 is provided with a pressure gauge 15. The pressure gauge 15 is accommodated in a recess 16 provided for this purpose and provided for in the upper portion of the head 3. The pressure gauge 15 is locked within the recess 16 through suitable locking means 17, such as a fastening ring 17. The locking means 17 are fastened to the head 3 by means of screws 18, which cooperate within complementary internal threads provided for in the thickness of the head 3.

Moreover, the recess 16 (and hence the inlet of the pressure gauge 15) is connected to the filling channel 10 through a pressure-gauge connecting channel 21, which is here descending.

The pressure-gauge connecting channel 21 ends at its upper end at the level of the recess 16, at the inlet of the pressure gauge 15. The pressure-gauge connecting channel 21 ends directly into the recess 16, but is indirectly connected to the filling channel 10 while passing through other channels.

The tightness between the pressure gauge 15 and the recess 16 is ensured by a pressure-gauge seal 19, which is here an O-ring. The pressure-gauge seal 19 is intercalated within a set-back 20.

When an inflatable equipment is connected, namely through the nozzle 12, the compressed air contained in the inflatable equipment circulates to the pressure gauge 15 that permits to indicate the pressure prevailing in the inflatable equipment.

In addition, if the pressure in the inflatable equipment is lower than that prevailing in the body 2, the filling non-return valve 11 plays its role and prevents the compressed air from leaving the body 2.

Figure 5:
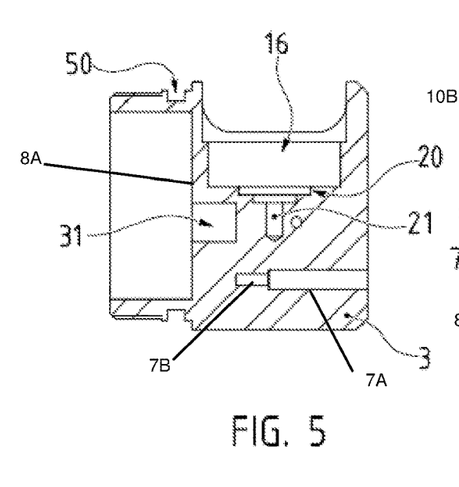
FIG. 5 is a schematic vertical cross-sectional view in a longitudinal median plane the head of FIGS. 3 and 4.

The various elements relating to the pressure gauge 15 are particularly visible in FIGS. 1, 2 and 5.

In order to control the deflation and the inflation of an inflatable equipment, the control means 6 comprise an inflation button 22 and a deflation button 23, which can be activated by a user of the cartridge 1.

The deflation button 23 permits to control the connection between the open air and the filling channel 10, which the inflatable equipment is connected to through the connecting hose 13 and the connecting orifice.

To this end, the deflation button 23 is movable between a resting deflation position, in which no circulation occurs between the filling channel 10 and the outdoor atmosphere, and an activated deflation position, in which the filling channel 10 communicates with the outdoor atmosphere.

According to the preferred embodiment, the deflation button 23 is formed of a push button actuating a deflation organ 24 mounted in translation along a deflation channel 25 that is provided for within the head 3. The deflation channel 25 has a bottom (the deflation channel 25 is blind) and ends at the level of the distal face 8. Therefore, the stroke of the deflation organ 24 is locked at a maximum position when it is in abutment on the bottom of the deflation channel 25.

In particular, at the bottom of the deflation channel 25 is inserted a deflation non-return valve 27 at the end of the deflation organ 24. Therefore, the deflation non-return valve 27 arrives in abutment on the bottom of the deflation channel 25.

In addition, the deflation organ 24 is automatically held in the locked deflation position, in which the flow between the filling channel 10 and the open air is cut off. To this end, a springy deflation restoring means 26 (here, a deflation compression spring 26) acts on the deflation organ 24.

In the present embodiment, the closing plate 9 ensures that the deflation organ 24 and the springy deflation restoring means 26 are maintained within the deflation channel 25, preventing their extraction.

According to the preferred embodiment, when the deflation button 23 is pressed, the deflation organ 24 is caused to slide along the deflation channel 25 until it abuts against the deflation non-return valve 27 and drives the latter from a closed deflation position into an open deflation position, in which the compressed air passes from the filling channel 10 to the outside of the cartridge 1. Conversely, when the deflation button 23 is no longer pressed, the springy deflation restoring means 26 returns the deflation organ 24 into its locked deflation position, closing the circulation between the filling channel 10 and the outside of the cartridge 1.

Figures 8, 9, 10, 11, 12:
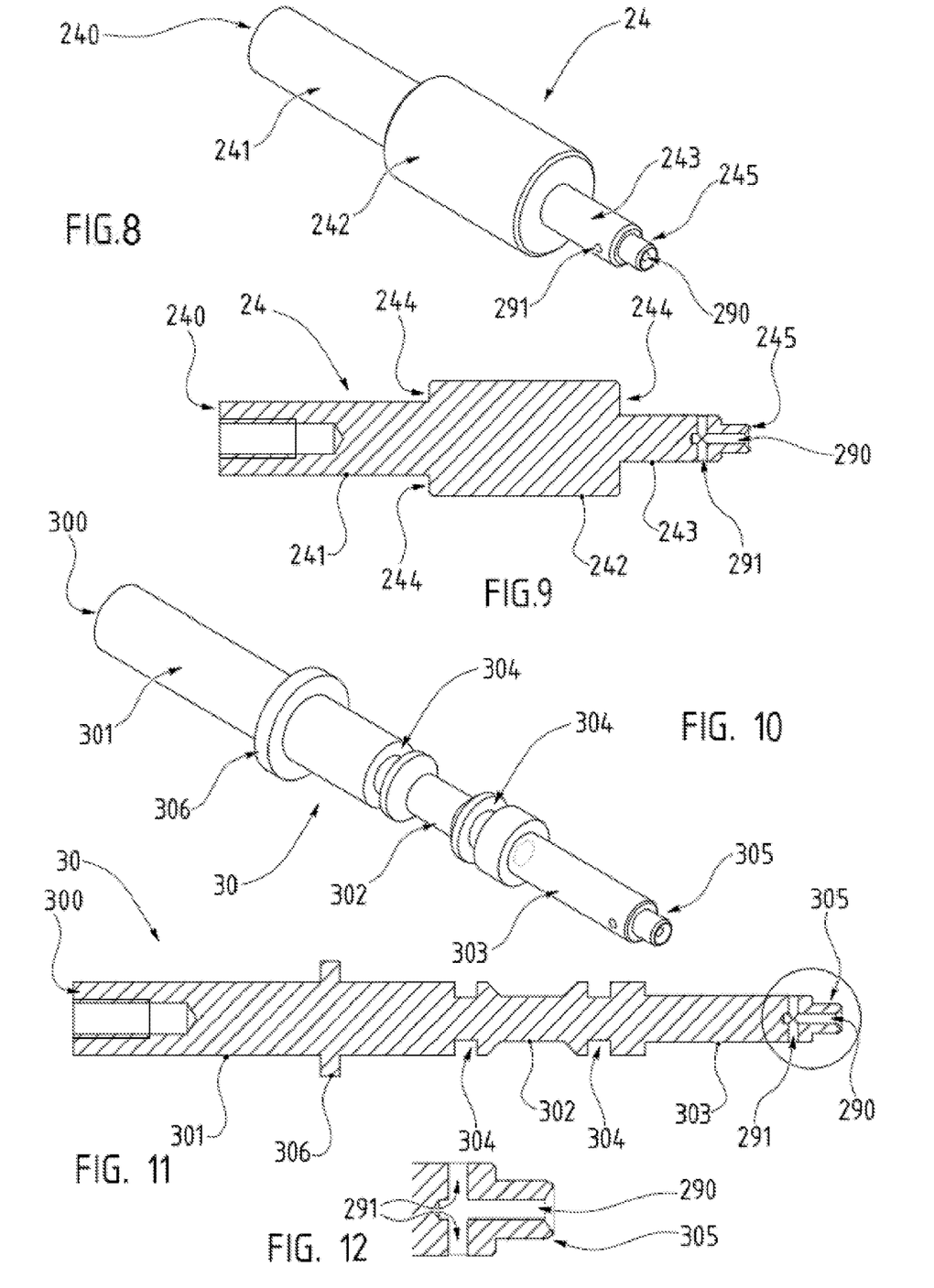
FIG. 8 is a schematic view in perspective, showing a deflation organ adapted for being slidably mounted in the head of FIGS. 3 to 7.
FIG. 9 is a schematic cross-sectional view in a longitudinal median plane the deflation organ of FIG. 8.
FIG. 10 is a schematic view in perspective, showing an inflating organ adapted for being slidably mounted in the head of FIGS. 3 to 7.
FIG. 11 is a schematic cross-sectional view, according to a longitudinal median plane the inflating organ of FIG. 10.
FIG. 12 is a schematic view, showing a detail of an end of the inflation and deflation organs of FIGS. 9 and 11.

More specifically, as shown in FIGS. 8 and 9, the deflation organ 24 has a generally cylindrical shape, with an outer diameter corresponding to the inner diameter of the deflation channel 25, with the clearance necessary to permit the sliding of the deflation organ 24 along the deflation channel 25.

According to the preferred embodiment, the deflation organ 24 comprises successively in the longitudinal direction, from a first deflation end 240 aimed at cooperating with the deflation button 23 to a second deflation end 245, a first deflation segment 241 having a first deflation diameter, a second deflation segment 242 having a second deflation diameter larger than the first deflation diameter, and a third deflation segment 243 having a third deflation diameter smaller than the first deflation diameter. The second deflation segment 242 is separated, on the one hand, from the first deflation segment 241, which is contiguous to it, by a first deflation set-back 244 and, on the other hand, from the third deflation segment 243, which is contiguous to it, by a second deflation set-back 244.

Therefore, the deflation channel 25 has a cross-section complementary to the outer shape of the deflation organ 24. In particular, the deflation channel 25 comprises successively in the longitudinal direction, starting from its bottom, a deflation end portion 250, which receives the third deflation segment 243, and a main deflation portion having a diameter larger than the diameter of the deflation end portion 250.

Figure 7:
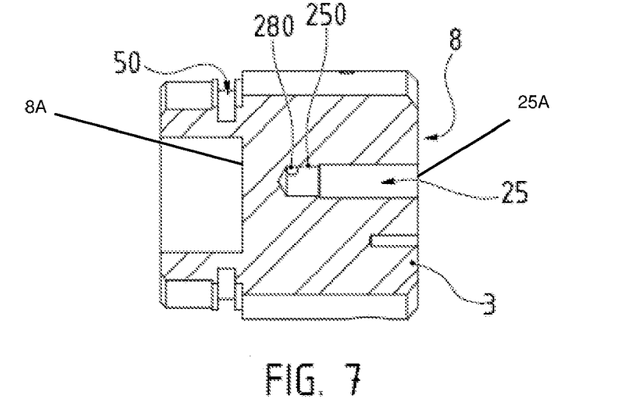
FIG. 7 is a schematic cross-sectional view in a horizontal plane passing through a deflation channel the head of FIGS. 3 to 6, the deflation channel being formed in the head.

Advantageously, the junction between the filling channel 10 and the deflation channel 25 occurs at the level of the deflation end portion 250. To this end, a deflation 28 connecting channel is formed in the head 3 and connects the end of deflation portion 250 and the filling channel 10. The deflation connecting channel 28 comprises a first end 280, which ends at the level of the filling channel 10 and a second end 280, which ends at the level of the deflation end portion 250, as shown in FIGS. 6 and 7. The deflation connecting channel 28 is visible in FIGS. 13 and 14.

Thus, when an inflatable equipment is connected to the filling channel 10 through the nozzle 12 and the deflation button 23 is actuated, the compressed air flows to the deflating channel 25, passes around the deflation organ 24 and is discharged to the open air through the second deflation end of the deflation channel 25.

More specifically, the discharge of the compressed air to the open air is permitted by the deflation non-return valve 27. The control of the deflation non-return valve 27 occurs by the translation of the deflation organ 24 following the pressing on the deflation button 23.

The second deflation end 245 of the deflation organ 24, which is located at the bottom of the deflation channel 25, presses the deflation non-return valve 27, which permits the compressed air contained in the deflation connecting channel 28 to flow out of the cartridge 1. In particular, in order to improve the flow of the fluid at the level of the second deflation end 245, the latter is perforated with internal deflation channels 29, which are adapted to be used by the compressed air.

As illustrated in FIG. 12, the internal deflation channels 29 comprise, on the one hand, a blind median deflation channel 290, which extends along the axis of the deflation organ 24 and ends at the second deflation end 245, and, on the other hand, at least two side deflation channels 291, which extend radially so as to connect the median deflation channel 290 to the outside of the deflation organ 24 at the level of the third deflation segment 243. Preferably, the side deflation channels 291 are diametrically opposite each other.

Figure 13:
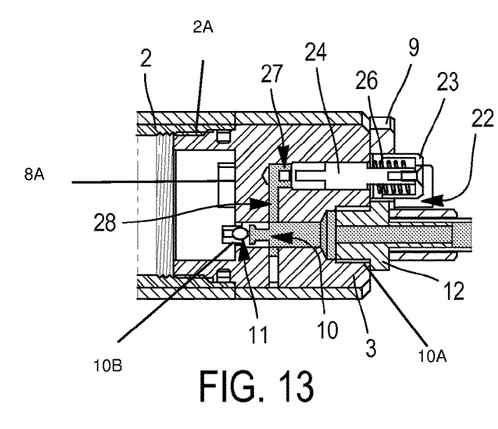
FIG. 13 is a schematic cross-sectional view, according to a first longitudinal plane the head connected to the body of the cartridge and to an inflatable equipment, the inflation and deflation buttons being in their resting position.
Figure 14:
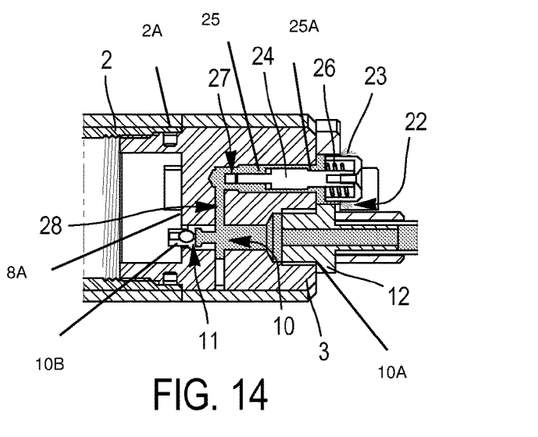
FIG. 14 is a schematic cross-sectional view, along the first longitudinal plane the head connected to the body of the cartridge and to the inflatable equipment of FIG. 13, the inflation button being in its resting position and the deflation button being in its activated position.

Thus, when the deflation organ 24 is pushed towards the bottom of the deflation channel 25 by pressing on the deflation button 23, the deflation non-return valve 27 is also pushed and the median deflation channel 290 is connected to the second end 280 of the deflation connecting channel 28. The compressed air then flows inside the median deflation channel 290 and the side deflation channels 291, exits the deflation organ 24 and flows around the latter along the deflation channel 25. When the pressing on the deflation button 23 is stopped, the springy deflation restoring means 26 pushes the deflation organ 24 into the locked deflation position, the deflation non-return valve 27 moves from its open deflation position to its closed deflation position and interrupts the connection between the deflation connecting channel 28 and the filling channel 10. FIG. 13 shows the head 3 with the deflation button 23 not being pressed, while FIG. 14 represents it with the deflation button 23 being pressed.

In particular, the deflation non-return valve 27 is provided with a deflation ball, which is automatically pushed into a locking position, in which the connection between the deflation connecting channel 28 and the filling channel 10 is cut off. The second deflation end 245 has a flared deflation crown, which forms a seat for receiving the deflation ball, when pressing the deflation button 23, in order to move the deflation ball and permitting the compressed air to circulate.

A peculiarity of the invention resides in that this kind of displacement of the deflation ball permits to apply a force adapted for displacing the deflation non-return valve 27 into its open deflation position, even though the pressure the compressed air exerts onto it is important (for example of about 40 bar).

The inflation button 22 controls the communication between the filling channel 10, which the inflatable equipment is connected to (through the connecting hose 13 and the connecting orifice) and, on the one hand, the pressure gauge 15 and, on the other hand, the body 2, in order to control the flow of compressed air between the inflatable equipment and the pressure gauge 15, and eventually the body 2.

Figure 15:
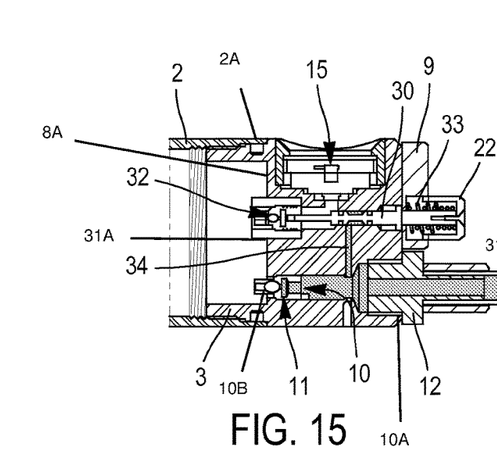
FIG. 15 is a schematic cross-sectional view, according to a second longitudinal plane the head connected to the body of the cartridge and to the inflatable equipment of FIGS. 13 and 14, the inflation and deflation buttons being in their resting position.
Figure 16:
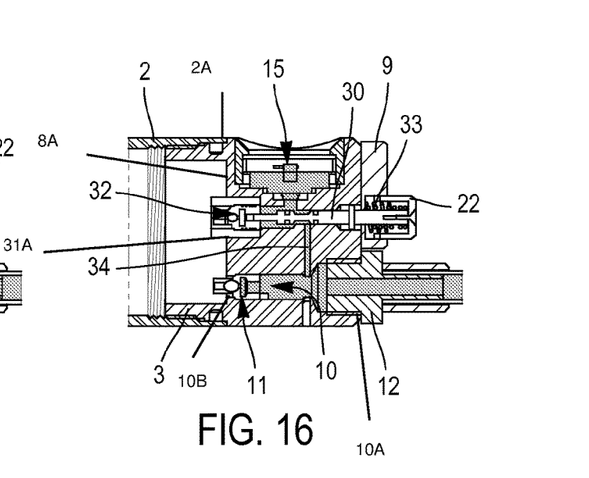
FIG. 16 is a schematic cross-sectional view, according to the second longitudinal plane the head connected to the body of the cartridge and to the inflatable equipment of FIGS. 13 to 15, the deflation button being in its resting position and the inflation button being in its first connecting position.
Figure 17:
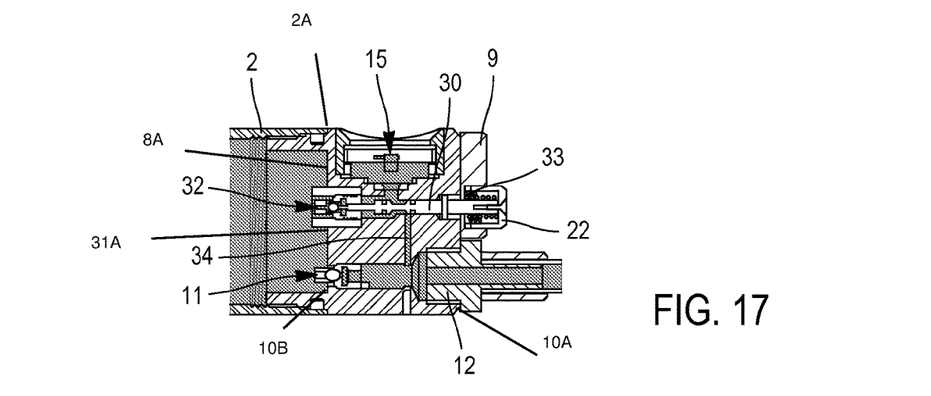
FIG. 17 is a schematic cross-sectional view, according to the second longitudinal plane the head connected to the body of the cartridge and to the inflatable equipment of FIGS. 13 to 16, the deflation button being in its resting position and the inflation button being in the second connecting position.

To this end, the inflation button 22 is movable between a resting inflation position as shown in FIG. 15, a first connecting position as shown in FIG. 16, and a second connecting position as shown in FIG. 17.

When it is in its resting inflation position, the inflation button 22 is not pressed and the compressed air contained in the filling channel 10 (which communicates with the inflatable equipment) is confined therein.

When it is in its first connecting position, the inflation button 22 permits the connection between the filling channel 10 and the pressure gauge 15, which permits to know the pressure prevailing in the inflatable equipment.

When it is in its second connecting position, the inflation button 22 permits the connection between the filling channel 10, the pressure gauge 15 and the body 2, which permits to inflate the inflatable equipment and to know the pressure prevailing therein.

According to the preferred embodiment, the inflation button 22 is formed of a push button actuating an inflation organ 30 mounted in translation along an inflation channel 31, which is provided for within the head 3. The inflation channel 31 ends, on the one hand, at the level of the distal face 8 and, on the other hand, into the body 2 through an inflation orifice 31A, which is provided for at the end of the head 3 at the proximal face 8A obstructing the unique opening 2A of the body 2.

In particular, at the bottom of the inflation channel 31 (at the level of the inflation orifice 31A) is inserted an inflating non-return valve 32, the default position of which prevents the passing of the compressed air between the body 2 and the inflation channel 31.

In addition, the inflating organ 30 is automatically maintained in the locked inflation position, in which the flow between the filling channel 10 and, on the one hand, the pressure gauge 15 and, on the other hand, the body 2 is cut off. To this end, a springy inflation restoring means 33 (here, an inflation compression spring 33) acts on the inflation organ 30.

In the present embodiment, the closing plate 9 ensures that the inflating organ 30 and the springy inflation restoring means 33 are maintained inside the inflation channel 31, preventing their extraction.

According to the preferred embodiment, pressing the inflation button 22 causes the inflating organ 30 to slide along the inflation channel 31 and permits the flow of the compressed air between the inside and the outside of the filling channel 10. Conversely, when the inflation button 22 is no longer pressed, the springy inflation restoring means 33 returns the inflation organ 30 into its locked inflation position, closing the flow between the inside and outside of the filling channel 10 and the outside of the cartridge 1.

More specifically, as shown in FIGS. 10 and 11, the inflation organ 30 has a generally cylindrical shape, with an outer diameter corresponding to the inner diameter of the inflation channel 31, with the clearance necessary to permit the sliding of the inflation organ 30 along the inflation channel 31.

According to the preferred embodiment, the inflation organ 30 includes successively in the longitudinal direction, from a first inflation end 300 aimed at cooperating with the inflation button 22 to a second inflation end 305, a first inflation segment 301 having a first inflation diameter, a second inflation segment 302 having a second inflation diameter smaller than the first inflation diameter, and a third inflation segment 303 having a third inflation diameter smaller than the second inflation diameter. The second inflation segment 302 is separated, on the one hand, from the first inflation channel 301, which is contiguous to it by a first inflation set-back and, on the other hand, from the third inflation segment 303, which is contiguous to it by a second inflation set-back.

In addition, the second inflation segment 302 is separated, on the one hand, from the first inflation segment 301 by a first groove 304 and, on the other hand, from the third inflation segment 303 by a second groove 304. The first and second grooves 304 extend on the periphery of the inflation organ 30 and are adapted to receive seals, which are here O-rings. The seals permit to ensure the tightness of an area between the second inflation segment 302 and the inner wall of the inflation channel 31, despite the small diameter of the second inflation segment 302.

Therefore, the inflation channel 31 has a cross-section complementary to the external shape of the inflation organ 30.

In addition, the first inflation segment 301 comprises a washer 306, which projects radially and which acts as a stop against a set-back provided for within the inflation channel 31, as illustrated in FIGS. 6, 16 and 17. The putting into abutment of the washer 306 against the set-back limits the maximum stroke of the inflation organ 30 within the inflation channel 31.

Advantageously, the junction between the filling channel 10 and the inflation channel 31 is performed at the level of the second segment 302. To this end, an inflation connecting channel 34 is provided for in the head 3 and connects the filling channel 10 to the portion of the inflation channel 31 where the second inflation segment 302 is located. The inflation connecting channel 34 is visible in FIGS. 15 to 17.

Thus, when an inflatable equipment is connected to the filling channel 10 through the nozzle 12 and when the inflation button 22 is not pressed, the inflation organ 30 in the locked inflating position limits the flow of compressed air from the filling channel 10 to the area between the second inflation segment 302 and the inner wall of the inflation channel 31, the seals preventing any flow of compressed air out of this area.

When inflatable equipment is connected to the filling channel 10 through the nozzle 12 and when the inflation button 22 is pressed so as to be in its first connecting position, the filling channel 10 communicates with the pressure gauge 15. In this configuration, the inflation organ 30 is moved in translation so that the connecting orifice between the inflation channel 31 and the pressure-gauge connecting channel 21 is located in the region between the second inflation segment 302 and the inner wall of the inflation channel 31. As illustrated in FIG. 16, in this configuration, the seal arranged in the second groove 304 does no longer ensure any tightness, so that the compressed air reaches the inflation non-return valve 32, which is in closed position.

Thus, the compressed air contained in the inflatable equipment flows to the pressure gauge 15, permitting to measure the internal pressure of the inflatable equipment.

Furthermore, it is possible to press both the inflation button 22 into its first connecting position and the deflation button 23, so as to be able to read, on the pressure gauge 15, the pressure prevailing in the inflatable equipment while the compressed air is evacuated from same.

It is then possible to regulate a reduction of the internal pressure of the inflatable equipment, while knowing accurately the measuring of this pressure thanks to pressure gauge 15.

When an inflatable equipment is connected to the filling channel 10 through the nozzle 12 and when the inflation button 22 is pressed so as to be in its second connecting position, the filling channel 10 communicates with the pressure gauge 15 and the body 2. In this second connecting position, which is a pressed position beyond the first connecting position, the compressed air contained in the body 2 passes through the inflation non-return valve 32 and penetrates into the inflatable equipment through the inflation channel 31, the inflation connecting channel 34, the filling channel 10, and the connecting hose 13. The control of the inflation non-return valve 32 is performed by the translation of the inflation organ 30 following the passing of the inflation button 22 into its second connecting position.

The second inflation end 305 of the inflation organ 30, which is located on the bottom of the inflation channel 21, presses the inflation non-return valve 22, which permits the compressed air contained in the body 2 to penetrate into the inflation channel 21. In particular, in order to improve the flow of the fluid at the level of the second inflation end 305, the latter is perforated with internal inflation channels 29, which are adapted to be used by the compressed air.

As illustrated in FIG. 12, the internal inflation channels 29 comprise, on the one hand, a blind median inflating channel 290, which extends along the axis of the inflation organ 30 and ends at the second deflation end 305 and, on the other hand, at least two side inflation channels 291, which extend radially so as to connect the median inflation channel 290 to the outside of the inflation organ 30 at the level of the third inflation segment 303. Preferably, the side inflation channels 291 are diametrically opposite each other.

Thus, when the inflation button 22 is driven into its second connecting position, the inflation organ 30 causes the opening of the inflation non-return valve 32. The compressed air then exits the body 2 and then flows inside the median inflation channel 290 and the inflation side channels 291, exits the inflation organ 30 and flows around the latter along the inflation channel 31 to the seal arranged in the first groove 304.

In particular, the inflation non-return valve 32 is provided with an inflation ball, which is automatically pushed into a locking position, in which the connection between the body 2 and the inflation channel 31 is cut off. The second inflation end 305 has a flared inflation crown, which forms a seat for receiving the inflation ball and, when pressing the inflation button 22, for displacing the inflation ball and letting the air flow.

This kind of displacement of the inflation ball permits to apply a force adapted for displacing the inflation non-return valve 32 into its open inflating position, even though the pressure prevailing in the body 2 is large (for example of about 40 bar).

During the inflation of the inflatable equipment, the inflation channel 31 is always connected to the pressure gauge 15, which permits to measure the increase in pressure of the inflatable equipment.

Thanks to the pressure gauge 15, it is possible to regulate the increase in internal pressure of the inflatable equipment.

Obviously, for the inflation of the inflatable equipment to occur, it is necessary that the pressure prevailing in the body 2 is higher than that in the inflatable equipment, and due to the inflation, the pressure prevailing in the body 2 decreases, while the one prevailing in the inflatable equipment increases.

Furthermore, it is possible to press both of the inflation button 22 to its second connecting position and the deflation button 23, so as to be able to read, on the pressure gauge 15, the pressure prevailing in the inflatable equipment, while decreasing or increasing this pressure. This particular actuation also permits to bring about a communication of the body 2 with the outside of the cartridge 1 and to thus perform a drainage of the body 2.

The passing and maintaining from one position to another of the inflation button 22 can be performed by means of a suitable system, in particular a ratchet, ensuring the locking in either position after pressing.

In connection with FIGS. 13 to 17, the compressed air is shown by the gray color.

According to the preferred embodiment, represented in the drawings, the body 2 has an internal volume of 220 milliliters, which is likely to contain up to 11 liters of compressed air at a pressure of 50 bar. The cartridge 1 comprising 50 bars of compressed air weighs about 280 g, it has a diameter of 4.5 cm and a height of about 20 cm, of which about 16 cm for the body 2.

According to conducted tests, the body 2 is resistant to an internal pressure of 80 bar.

Such a cartridge permits to accurately regulate the pressure of an inflatable equipment, thanks to the pressure gauge 15.

Alternatively, the cartridge 1 is adapted to cooperate with an air-compression device for a cycle, as described in patent application WO 2013/076429, for its filling with compressed air. The means for supplying the cartridge with compressed air can also be an electric compressor.

Thus, the cartridge 1 according to the invention permits to efficiently and accurately control, using a single device, the inflation and deflation of an equipment, while measuring the evolution of its internal pressure.

The cartridge 1 thus permits to inflate the wheels of a cycle, the usual pressure of which is of about 3 bar, the fork of a cycle, the usual pressure of which is of about 8 bar, the dampers of a cycle, the usual pressure of which is generally between 15 and 25 bar. It also permits, thanks to the large flow rate of compressed air it releases, to fit a tubeless tire ("tubeless").

Preferably, the pressure indicator 7 comprises a safety valve 7B permitting to define the maximum of the pressure prevailing in the body 2 (for example 50 bar). More specifically, the safety valve 7B is arranged in a safety channel 7A, which is provided for in the head 3 and which connects the outside of the cartridge 1 to the measuring channel 71. Once the maximum pressure has been reached, the compressed air contained in the body 2 and the measuring channel 71 causes the displacement of the safety valve 7B and exits the cartridge 1.

Also preferably, the filling channel 10 comprises, immediately before the filling orifice, a change of direction permitting to make compact the assembly formed of the cartridge and the connecting hose 13. More specifically, the filling channel 10 comprises a first 90°-bend followed by a second 90°-bend, so that the general shape of the filling channel is a U-shape. Preferably, the second 90° bend is made in a complementary organ mounted pivotally and tight with respect to the head around the axis of the segment of the filling channel 10 delimited by the two 90° bends. This pivoting permits to easily change the direction of the filling orifice depending on whether the connecting hose 13 is connected to an inflatable equipment or to a means for supplying compressed air or not (the connecting hose 13 extends from the head 3 and along the body 2).

I claim:

1. A compressed-air storage cartridge, comprising:
   a body having an opening; and
   a head being hermetically sealed to said opening of said body and having a distal face and a proximal face opposite said distal face, said proximal face facing said body, said head comprising:
      a filling channel having a connecting orifice at one end of said filling channel at said distal face and a filling orifice at an opposite end of said filling channel at said proximal face, and comprising a filling non-return valve, said filling channel being in fluid connection to said body through said filling non-return valve so as to control flow of compressed air within said body through said filling channel; and
      an inflation channel having an inflation orifice at one end of said inflation channel at said proximal face and comprising an inflation non-return valve within said inflation channel, and an inflating organ at an opposite end of said inflation channel at said distal face, said inflating organ having an inflation button,
   wherein said inflation channel is in fluid connection to said filling channel through said inflating organ, said inflation orifice, said filling non-return valve and said inflation non-return valve so as to control flow of compressed air within said body through said filling channel and said inflation channel, and
   wherein said inflation channel is in fluid connection to said filling channel through said inflating organ so as to control flow of air within said filling channel through said inflation channel.

2. The cartridge, according to claim 1, further comprising:
   a compressed-air supply means having a pressure higher than pressure in said body,
   wherein said compressed-air supply means is in fluid connection to said connecting orifice of said filling channel and in fluid connection to said body through said filling non-return valve so as to control flow of compressed air from said compressed-air supply means to said body through said filling channel.

3. The cartridge, according to claim 1, wherein said inflation button of said inflation channel of said head comprises an inflation springy restoring means so as to controll actuation of said inflation organ into a locked inflation position and so as to control flow compressed air from said body through said inflation non-return valve.

4. The cartridge, according to claim 1, wherein said head further comprises a pressure gauge in fluid connection with said inflation channel and in fluid connection with said filling channel through said inflation organ so as to control flow of air from said filling channel to said pressure gauge with said inflation button.

5. The cartridge, according to claim 4, wherein said inflation organ has a position determined by said inflation button, and wherein said position is selected from one of a group consisting of a locked inflation position corresponding to said inflation channel being sealed to said filling channel and said body, an open inflation position corresponding to said inflation channel being in fluid connection to said filling channel and said body and a between position corresponding to said inflation channel being in fluid connection to said filling channel and sealed to said body.

6. The cartridge, according to claim 5, wherein said pressure gauge is in fluid connection with said filling channel, when said inflation organ is in said open inflation position.

7. The cartridge, according to claim 1, wherein said head further comprises:
   a deflation channel, having a deflation orifice at one end of said deflation channel at said distal face and comprising a deflation non-return valve within said deflation channel at an opposite end of said deflation channel, and a deflation organ between said deflation non-return valve and said deflation orifice, said deflation organ having a deflation button.
   wherein said deflation channel is in fluid connection to said filling channel through said deflation organ and said deflation non-return valve so as to control flow of air within said filling channel through deflation orifice of said deflation channel.

8. The cartridge, according to claim 7, wherein said deflation button of said deflation channel of said head comprises a springy deflation restoring means so as to control flow air from said filling channel.

9. The cartridge, according to claim 5,
   wherein said head further comprises:
   a deflation channel having a deflation orifice at one end of said deflation channel at said distal face and comprising a deflation non-return valve within said deflation channel at an opposite end of said deflation channel, and a deflation organ between said deflation non-return valve and said deflation orifice, said deflation organ having a deflation button,
   wherein said deflation channel is in fluid connection with said filling channel through said deflation organ and said deflation non-return valve so as to control flow of air within said filling channel through deflation orifice of said deflation channel,
   wherein the said inflation organ is in said between position by said inflation button, said deflation organ being in fluid connection with said filling channel by said deflation button.

10. The cartridge, according to claim 1, wherein said head further comprises a pressure indicator being comprised of a measuring channel and a measuring organ within said measuring channel and being in fluid connection with said body and sealed to said inflation channel and said filling channel.

11. The cartridge, according to claim 10, wherein said head further comprises a safety channel with a safety valve, said safety channel being in fluid connection with said measuring channel so as to control air flow through said body, said measuring channel and said safety valve.

12. The cartridge, according to claim 1, further comprising:
a connecting channel between said inflation channel and said filling channel,
wherein said inflation channel is in fluid connection to said filling channel through said inflating organ and said connecting channel so as to control flow of air within said filling channel through said inflation channel.

13. The cartridge, according to claim 12, wherein said pressure gauge is in fluid connection to said filling channel through the valve is formed by said inflation organ and said connecting channel.

14. A compressed-air storage cartridge, comprising:
a body having an opening; and
a head being hermetically sealed to said opening of said body and having a distal face and a proximal face opposite said distal face, said proximal face facing said body, said head comprising:
  a filling channel having a connecting orifice at one end of said filling channel at said distal face and a filling orifice at an opposite end of said filling channel at said proximal face, and comprising a filling non-return valve, said filling channel being in fluid connection to said body through said filling non-return valve so as to control flow of compressed air within said body through said filling channel;
  an inflation channel having an inflation orifice at one end of said inflation channel at said proximal face and comprising an inflation non-return valve within said inflation channel, and an inflating organ at an opposite end of said inflation channel at said distal face, said inflating organ having an inflation button,
wherein said inflation channel is in fluid connection to said filling channel through said inflating organ, said inflation orifice, said filling non-return valve and said inflation non-return valve so as to control flow of compressed air within said body through said filling channel and said inflation channel, and
wherein said inflation channel is in fluid connection to said filling channel through said inflating organ so as to control flow of air within said filling channel through said inflation channel; and
a pressure gauge in fluid connection with said inflation channel and in fluid connection with said filling channel through said inflation organ so as to control flow of air from said filling channel to said pressure gauge with said inflation button.

15. A compressed-air storage cartridge 1, comprising:
a body having an opening; and
a head being hermetically sealed to said opening of said body and having a distal face and a proximal face opposite said distal face, said proximal face facing said body, said head comprising:
  a filling channel having a connecting orifice at one end of said filling channel at said distal face and a filling orifice at an opposite end of said filling channel at said proximal face, and comprising a filling non-return valve, said filling channel being in fluid connection to said body through said filling non-return valve so as to control flow of compressed air within said body through said filling channel;
  an inflation channel having an inflation orifice at one end of said inflation channel at said proximal face and comprising an inflation non-return valve within said inflation channel, and an inflating organ at an opposite end of said inflation channel at said distal face, said inflating organ having an inflation button,
wherein said inflation channel is in fluid connection to said filling channel through said inflating organ, said inflation orifice, said filling non-return valve and said inflation non-return valve so as to control flow of compressed air within said body through said filling channel and said inflation channel, and
wherein said inflation channel is in fluid connection to said filling channel through said inflating organ so as to control flow of air within said filling channel through said inflation channel; and
a pressure indicator being comprised of a measuring channel and a measuring organ within said measuring channel and being in fluid connection with said body and sealed to said inflation channel and said filling channel.

* * * * *